(12) United States Patent
Qiu et al.

(10) Patent No.: US 11,545,889 B2
(45) Date of Patent: Jan. 3, 2023

(54) DEADTIME OPTIMIZATION FOR GAN HALF-BRIDGE AND FULL-BRIDGE SWITCH TOPOLOGIES

(71) Applicant: GaN Systems Inc., Ottawa (CA)

(72) Inventors: Yajie Qiu, Kanata (CA); Larry Spaziani, Chelmsford, MA (US)

(73) Assignee: GaN Systems Inc., Kanata (CA)

( * ) Notice: Subject to any disclaimer, the term of this patent is extended or adjusted under 35 U.S.C. 154(b) by 0 days.

(21) Appl. No.: 17/536,542

(22) Filed: Nov. 29, 2021

(65) Prior Publication Data

US 2022/0209650 A1 Jun. 30, 2022

Related U.S. Application Data

(60) Provisional application No. 63/131,867, filed on Dec. 30, 2020.

(51) Int. Cl.
*H02M 1/38* (2007.01)
(52) U.S. Cl.
CPC ..................... *H02M 1/38* (2013.01)
(58) Field of Classification Search
CPC ....................................... H02M 1/38
USPC .......................................... 327/109
See application file for complete search history.

(56) References Cited

U.S. PATENT DOCUMENTS 8,203,359 B2 * 6/2012 Dequina ............... H02M 3/158
326/82

OTHER PUBLICATIONS

Qiu, Y, et al.; "Diagnosing for Cross-conduction in GaN Half-Bridge"; 2020 IEEE Applied Power Electronics Conference and Exposition (APEC), 2020; pp. 2577-2583; doi: 10.1109/APEC39645.2020.9124086.

* cited by examiner

*Primary Examiner* — Tomi Skibinski
(74) *Attorney, Agent, or Firm* — Miltons IP/p.i.

(57) ABSTRACT

Disclosed is a method for deadtime optimization in a half-bridge switch or full-bridge switch wherein high-side and low-side switches comprise GaN transistors; a circuit for implementing the method; and a power switching system comprising a GaN half-bridge or a GaN full-bridge and a deadtime optimization system. The circuit comprises a drain current bump filter for generating a current charge output; and circuit elements for comparing the current charge output to a reference current charge $C_{oss}$ and generating a deadtime adjust signal. The deadtime adjust signal may be used to adjust deadtime to reduce or minimize deadtime, and deadtime losses, while avoiding cross-conduction.

9 Claims, 9 Drawing Sheets

Comparison of typical reverse conduction
(Quadrant 3) characteristics for an
example GaN HEMT vs. an example Si MOSFET Deadtime loss:
$$P_{deadtime} = fsw * E_{deadtime} = fsw * (-Vgsoff + Vth + Rdson\_GaN(Tj) *Id) * Id * T_{deadtime}$$

Hard-switching transitions (a) S1 conducting; (b) Deadtime; (c) Current commutation; (d) Voltage commutation; (e) S2 conducting.

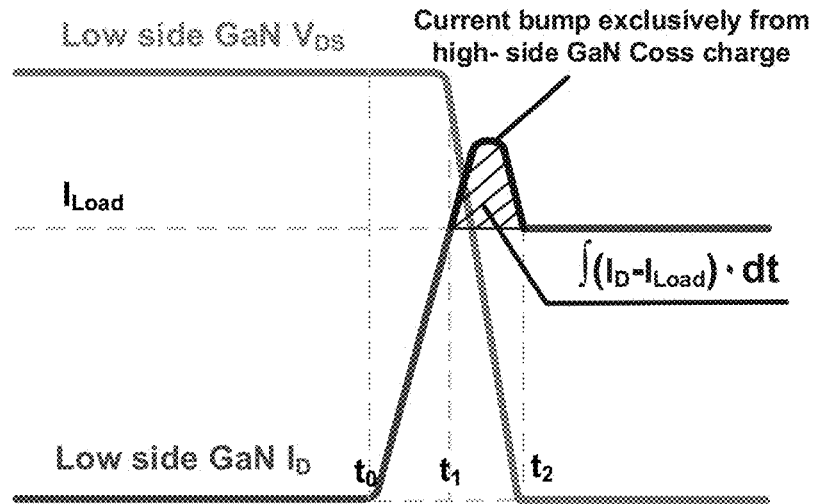
Hard-switching turn-on waveforms for GaN HEMT
Fig. 4
If there is no cross-conduction, then the following equation should be satisfied:
$$\int_{t_1}^{t_2} (I_D(t) - I_{LOAD})dt = \int_0^{V_{dc}} C_{oss}(V_{DS})\, dV_{DS} \quad 0 < V_{DS} < V_{dc}; \; t_1 < t < t_2$$
Fig. 5
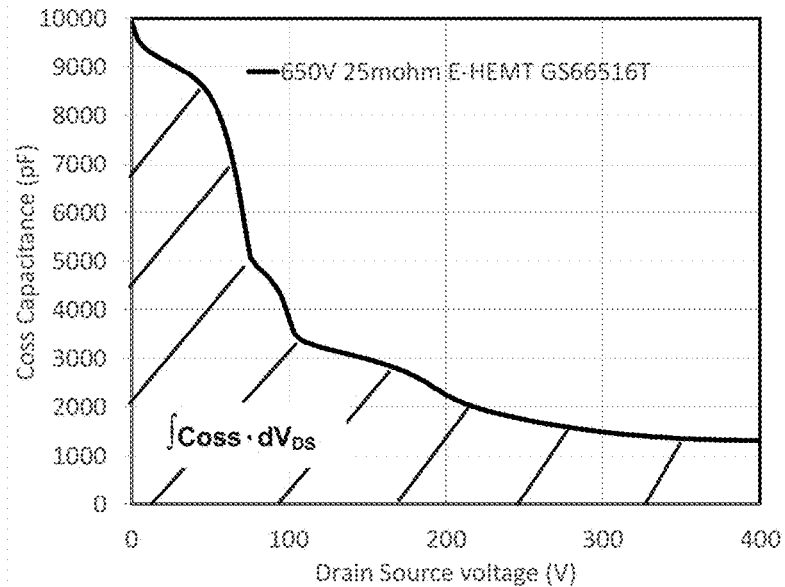
GaN HEMT (GS66516T) parasitic capacitance $C_{oss}$ curve
Fig. 6

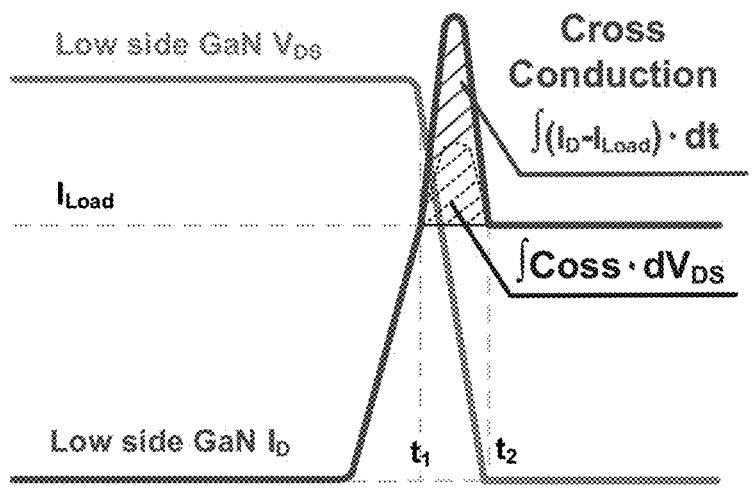
Case 1: Cross-conduction occurs during the voltage commutation
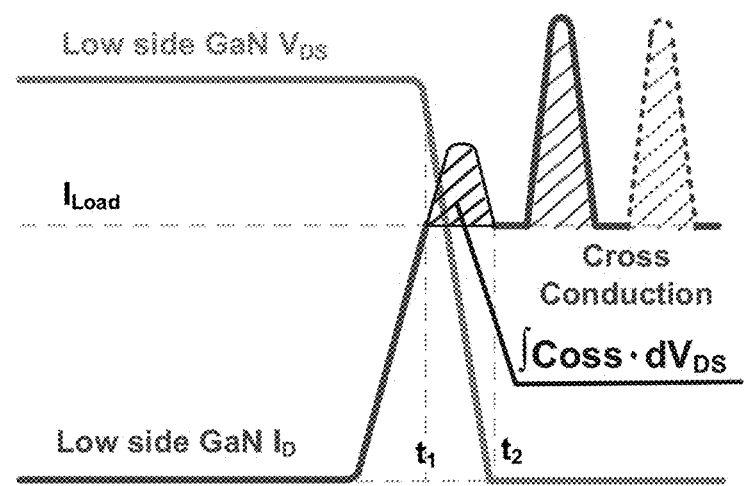
Case 2: Cross-conduction occurs after the voltage commutation
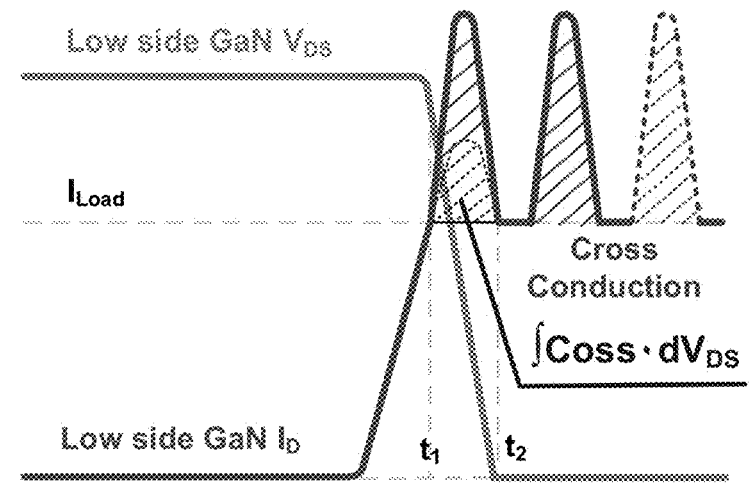
Case 3: Cross-conduction occurs during & after the voltage commutation
Possible Cross-conduction low side GaN $I_D$ waveforms of a GaN half bridge
Fig. 7

GaN Half Bridge Cross-conduction Example @ voltage commutation ($V_{DS} = 286V$, $R_{g\_on} = 16\Omega$, $I_{Load} = 2A$)

GaN Half Bridge Cross-conduction Example during & after the voltage commutation ($V_{DS}=296V$, $R_{g\_on} = 16\Omega$, $I_{Load} = 2A$)

GaN Half Bridge with no Cross-conduction with $V_{GS\_Off} = -3V$ ($V_{DS}=296V$, $R_{g\_on} = 16\Omega$, $I_{Load} = 2A$)

$$\int_{0V}^{286V} C_{oss\_GS66516T}(V_{DS})dV_{DS} = 120\ nC$$

$$\int_{0V}^{296V} C_{oss\_GS66516T}(V_{DS})dV_{DS} = 122\ nC$$

|  | $V_{DS}$ | Calculated current charge from high-side GaN $C_{oss}$ | Current bump area Coss-conduction | Cross-conduction? |
|---|---|---|---|---|
| Cross-conduction Example in Fig. 8 | 286 V | 120 nC | 314 nC | Yes |
| Cross-conduction Example in Fig. 9 | 296 V | 122 nC | 446 nC | Yes |
| Normal Case in Fig. 10 (no cross-conduction) | 296 V | 122 nC | 133 nC | No |

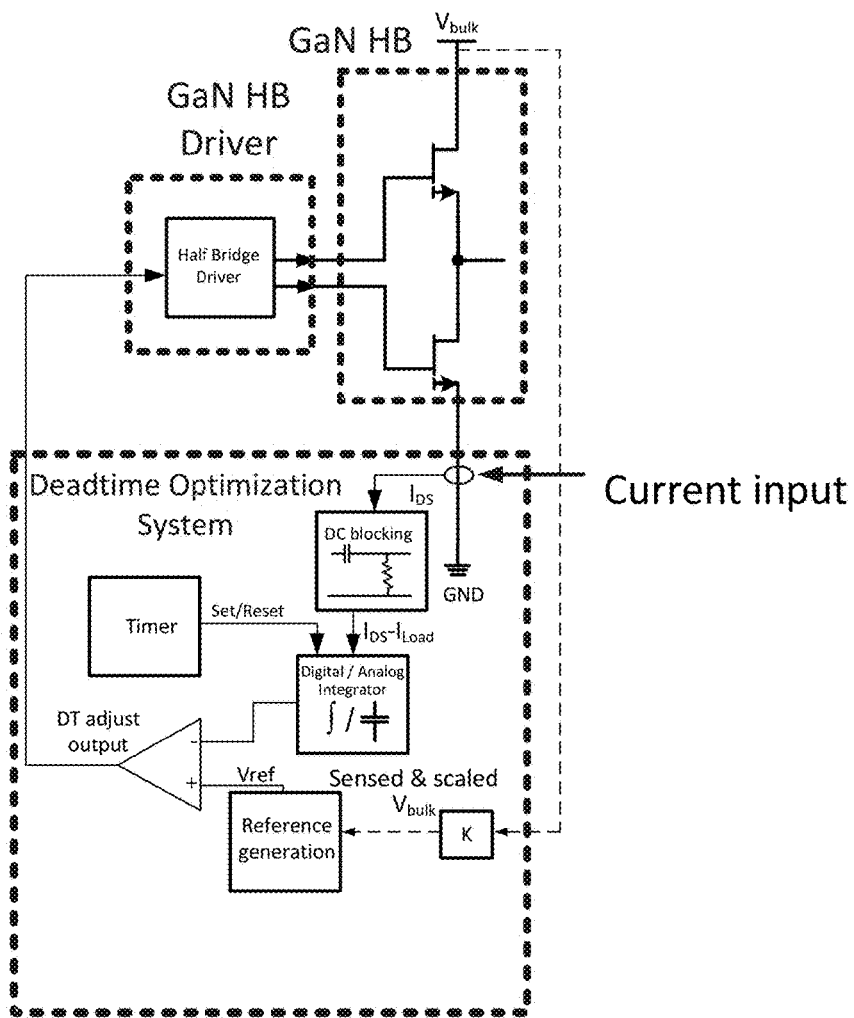

- Timer - to record and count the optimized deadtime
- DC Blocking unit - to get $I_D\text{-}I_{load}$ information during the switching process; this could also be a Subtractor
- Integrator - to obtain $\int_{t_1}^{t_2}(I_D(t) - I_{LOAD})dt$

- Reference generation unit - a constant value once the GaN transistors are selected and the $V_{bulk}$ voltage is selected, calculated from the below equation. It can be either calculated and adjusted in the real time or from an off-line look-up table changing with the sensed Vdc (Vbulk)

$$\int_0^{V_{dc}} C_{oss}(V_{DS})\, dV_{DS} \quad 0 < V_{DS} < V_{dc};\ t_1 < t < t_2$$

- DT adjustment unit - output the deadtime control signal to the GaN drivers according to the result of the comparator
- Use the Timer to keep decreasing the deadtime between high-side and low-side GaNs until the following condition met:

$$\int_{t_1}^{t_2}(I_D(t) - I_{LOAD})dt > \int_0^{V_{dc}} C_{oss}(V_{DS})\, dV_{DS} \quad 0 < V_{DS} < V_{dc};\ t_1 < t < t_2$$

US 11,545,889 B2

DEADTIME OPTIMIZATION FOR GAN HALF-BRIDGE AND FULL-BRIDGE SWITCH TOPOLOGIES

CROSS-REFERENCE TO RELATED APPLICATION(S)

This application claims priority from U.S. provisional patent application No. 63/131,867 entitled "DEADTIME OPTIMIZATION FOR GaN HALF-BRIDGE AND FULL-BRIDGE SWITCH TOPOLOGIES" filed Dec. 30, 2020, which is incorporated herein by reference in its entirety.

TECHNICAL FIELD

This invention relates to a power switching devices, such as half-bridge and full-bridge topologies, comprising GaN transistors, e.g. GaN HEMTs (High Electron Mobility Transistors) and methods for deadtime optimization.

BACKGROUND

Complementary driving signals are required in half-bridge/full-bridge GaN power switching applications to achieve synchronous rectifying, bidirectional current control, et al. Deadtime is embedded intentionally between the high-side and low-side driving signals to avoid cross-conduction. Deadtime losses becomes non-negligible at high switching frequency. Accurate deadtime control helps to avoid potential cross-conduction while minimizing extra deadtime loss. Therefore, it is necessary to diagnose and reduce cross-conduction/potential cross-conduction in GaN half-bridge/full-bridge designs before powering up the system.

Conventional methods for deadtime optimization for power switching devices comprising Si power MOSFETs include, for example:

Using an auxiliary winding on main transformer.
Disadvantage: requires auxiliary winding voltage sensing.
Modulating dead-time period with operating frequency of the converter. Disadvantage: requires a dedicated pin for nominal deadtime adjust.
Sensing the drain source voltage VDS and adjusting the optimum dead-time period with respect to the actual operating conditions of the converter using a high-voltage dV/dt detector. Disadvantage: The dV/dt characteristics of Si MOSFET switches are different from the dV/dt characteristics of GaN switches; dV/dt detectors designed for Si devices do not work for GaN devices; also, $dV_{DS}/dt$ is non-linear and changes with gate resistance $R_g$, drain current $I_D$ and junction temperature $T_j$.

There is a need for improved or alternative methods of diagnosing cross-conduction and providing deadtime control for half-bridge and full-bridge switch topologies comprising GaN transistors.

SUMMARY OF INVENTION

The present invention seeks to provide a method and a circuit for deadtime optimization for half-bridge and full-bridge switch topologies comprising GaN transistors, which mitigate or overcome one or more of the above-mentioned issues, or at least provide an alternative solution.

A first aspect of the invention provides a method of controlling deadtime for a half-bridge or full-bridge switch topology comprising a driver, wherein high side and low side switches comprise GaN transistors, comprising:

receiving a first input comprising a low-side drain current signal $I_D$;
receiving a second input indicative of a bulk voltage $V_{dc}$;
generating a current difference signal $I_D-1_{LOAD}$, where $I_{LOAD}$ is a load current;
integrating the current difference signal $I_D-1_{LOAD}$ over a time interval of $t_2-t_1$ during voltage commutation to generate a current charge output $$\int_{t_1}^{t_2}(I_D(t)-I_{LOAD})dt;$$

based on the voltage $V_{dc}$ obtaining a reference current charge $C_{oss}$ for the high side switch $$\int_0^{V_{dc}}C_{oss}(V_{DS})dV_{DS} 0<V_{DS}<V_{dc}; t_1<t<t_2;$$

comparing the current charge output and the reference current charge $C_{oss}$, and generating a deadtime adjust output signal;
outputting the deadtime adjust signal to the driver.

For example, the deadtime adjust signal may be used to reduce or optimize deadtime to reduce deadtime losses, while avoiding cross-conduction. If cross-conduction is occurring, the current charge output will be significantly greater than the reference current charge $C_{oss}$, and the deadtime adjust signal can be used to increase deadtime, or other operating parameters, can be changed, to avoid cross-conduction. If cross-conduction is not occurring, the current charge output will be close to, or ideally will match, the reference current charge $C_{oss}$. For example, if there is no cross-conduction, the deadtime adjust signal may be used to decrease the deadtime, to reduce deadtime losses, until the current charge output exceeds the reference current charge $C_{oss}$. Thus, the deadtime can be optimized, e.g. minimized, to a value that avoids cross-conduction, while minimizing deadtime losses.

A second aspect of the invention provides a circuit for controlling deadtime for a half-bridge or full-bridge switch topology comprising a driver, wherein high-side and low-side switches comprise GaN transistors, the circuit comprising a drain current bump filter for generating a current charge output; and circuit elements for comparing the current charge output to a reference current charge $C_{oss}$ and generating a deadtime adjust signal.

In an example embodiment, a circuit for controlling deadtime for a half-bridge or full-bridge switch topology wherein high-side and low-side switches comprise GaN transistors, an input for receiving a low-side drain current $I_D$;
an input for sensing a bulk voltage $V_{dc}$;
a unit for generating a current difference signal $I_D-1_{LOAD}$, where $I_{LOAD}$ is a load current;
a timer for recording and counting the deadtime;
an integrator for integrating the current difference signal $I_D-1_{LOAD}$ over a time interval of $t_2-t_1$ during voltage commutation to generate a current charge output $$\int_{t_1}^{t_2}(I_D(t)-I_{LOAD})dt;$$

a reference source for obtaining a reference current charge $C_{oss}$ based on $V_{dc}$;
deadtime adjustment circuitry for receiving the current charge output from the integrator,
comparing the current charge output with the reference current charge $C_{oss}$, and generating a deadtime adjust signal;
an output for outputting the deadtime adjust signal to the driver.

For example, the unit for generating a current difference signal $I_D-1_{LOAD}$ may be a DC blocking unit or a subtractor. The integrator may be an analog integrator or a digital integrator. For example, the reference source may provide real-time calculation or adjustment of the reference current charge $C_{oss}$, or the reference source may perform an offline look-up from a table of reference current charge values.

Methods and circuits of example embodiments for implementing the method use the drain current bump area during voltage commutation to diagnose and avoid cross-conduction, and adjust the deadtime accordingly to minimize deadtime losses, while avoiding cross conduction. The deadtime optimization circuit comprises a drain current bump filter and provides a sensing method which is applicable to GaN half-bridge and GaN full-bridge switch topologies.

Methods and circuits of example embodiments may provide, for example, cycle-by-cycle (fast) implementation of deadtime optimization; implementation which provides periodic ongoing measurement and adjustment for deadtime optimization, or one time implementation, e.g. at the factory or on initial power-up.

Another aspect of the invention provides a power switching system comprising a GaN half-bridge or GaN full-bridge and a deadtime optimization system comprising a drain current bump filter for generating a current charge output during voltage commutation; and circuit elements for comparing the current charge output to a reference current charge $C_{oss}$, and generating a deadtime adjust signal, as disclosed herein.

The foregoing and other objects, features, aspects and advantages of the present invention will become more apparent from the following detailed description, taken in conjunction with the accompanying drawings, of embodiments of the invention, which description is by way of example only.

BRIEF DESCRIPTION OF THE DRAWINGS

FIG. 4 shows hard-switching turn-on waveforms for an example GaN E-HEMT;

FIG. 5 shows an equation to be satisfied if there is no cross-conduction;

FIG. 6 shows a plot of parasitic capacitance $C_{oss}$ (pF) vs. drain-source voltage $V_{DS}$ (V) for an example GaN HEMT (GS66516T);

FIG. 7 shows schematic example waveforms for Case 1: cross-conduction occurs during voltage commutation; Case 2: cross-conduction occurs after voltage commutation; Case 3: cross-conduction occurs during and after voltage commutation;

FIG. 11 shows a table listing some parameters for the examples shown in FIGS. 8, 9 and 10; and FIG. 12 shows a functional block diagram of a circuit for implementing a method of deadtime optimization of an example embodiment;

DETAILED DESCRIPTION

Figure 1:
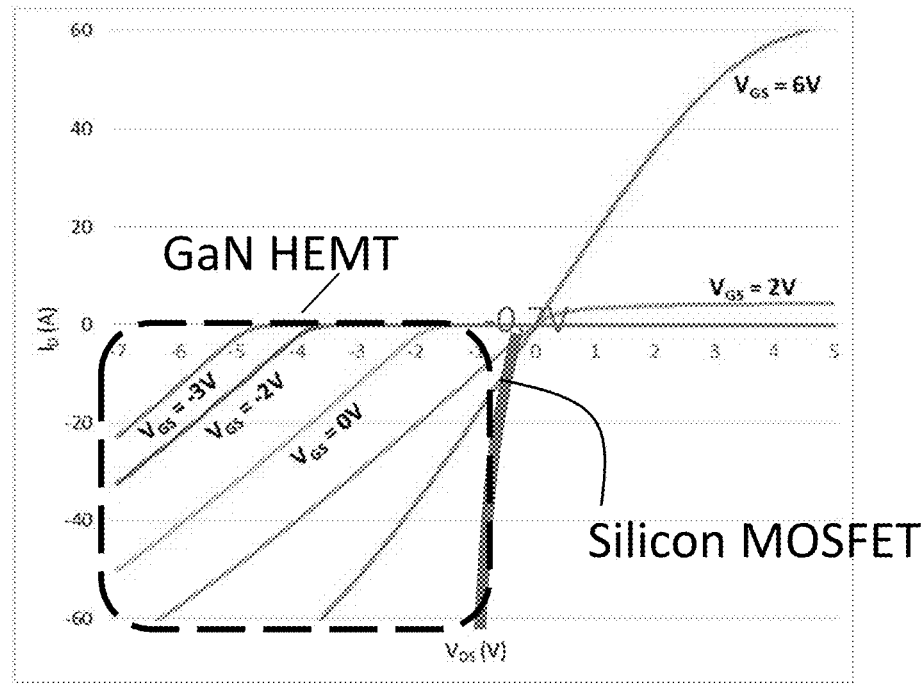
FIG. 1 shows a comparison of typical reverse conduction (Quadrant 3) characteristics for an example GaN E-HEMT vs. an example Si MOSFET.

FIG. 1 shows a comparison of typical reverse conduction (Quadrant 3) characteristics for an example GaN E-HEMT vs. an example Si MOSFET. The reverse conduction of a GaN E-HEMT has a "diode" like characteristic and its reverse conduction voltage drop is higher than for a Si MOSFET, so complementary driving signals are required for driving GaN transistors for half-bridge and full-bridge applications, such as, synchronous rectifiers, buck converters, LLC, ACF and motor drives. A method for deadtime optimization is required for GaN half-bridge and full-bridge switch topologies to avoid cross-conduction while minimising deadtime loss, i.e. minimizing the time of operation in Quadrant 3.

Figure 2A:
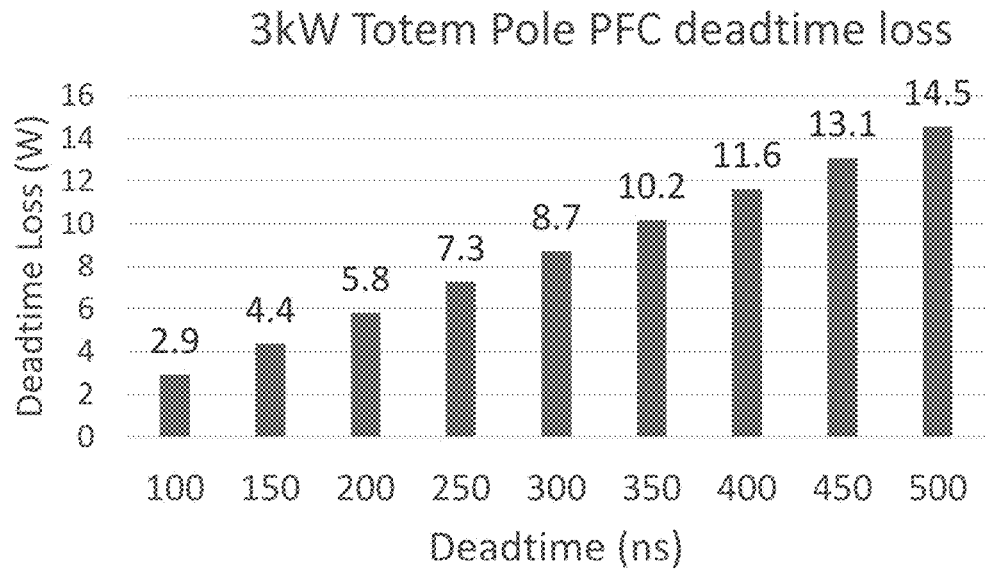
FIG. 2A shows a plot of Deadtime Loss (W) vs. Deadtime (ns) for an example 3 kW Totem Pole PFC
Figure 2B:
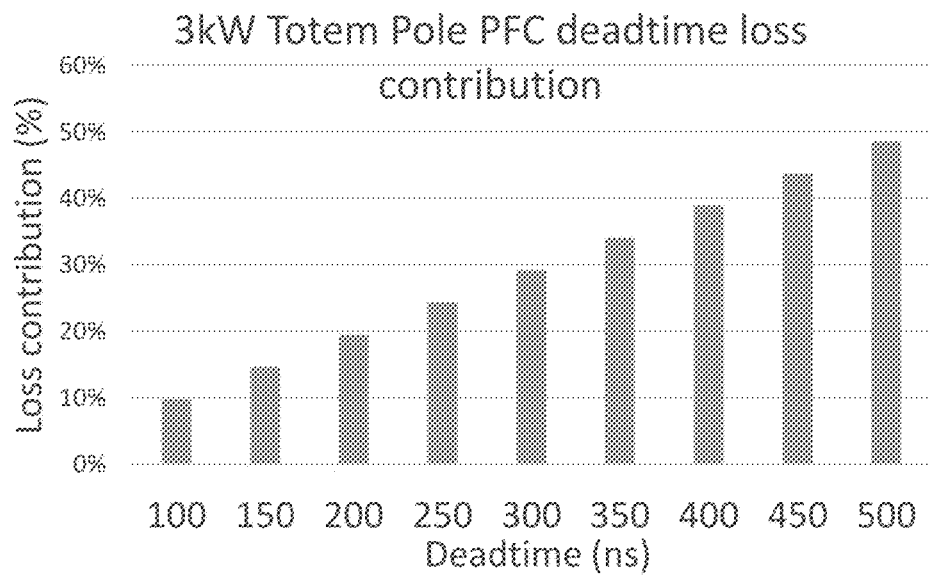
FIG. 2B shows a plot of Deadtime Loss contribution (%) vs. Deadtime (ns) for the example 3 kW Totem Pole PFC.

FIG. 2A shows a plot of Deadtime Loss (W) vs. Deadtime (ns) for an example 3 kW Totem Pole PFC, for a switching frequency fsw=130 kHz. FIG. 2B shows a plot of Deadtime Loss contribution (%) vs. Deadtime (ns) for the example 3 kW Totem Pole PFC.

The deadtime loss is calculated as:

$$P_{deadtime} = fsw^* E_{deadtime} = fsw^*(-Vgsoff + Vth + Rdson\_GaN(Tj)^* Id)^* Id^* T_{deadtime}$$

These results illustrate how the deadtime $T_{deadtime}$ contributes to deadtime losses and that deadtime losses are a significant loss contribution.

Figure 3:
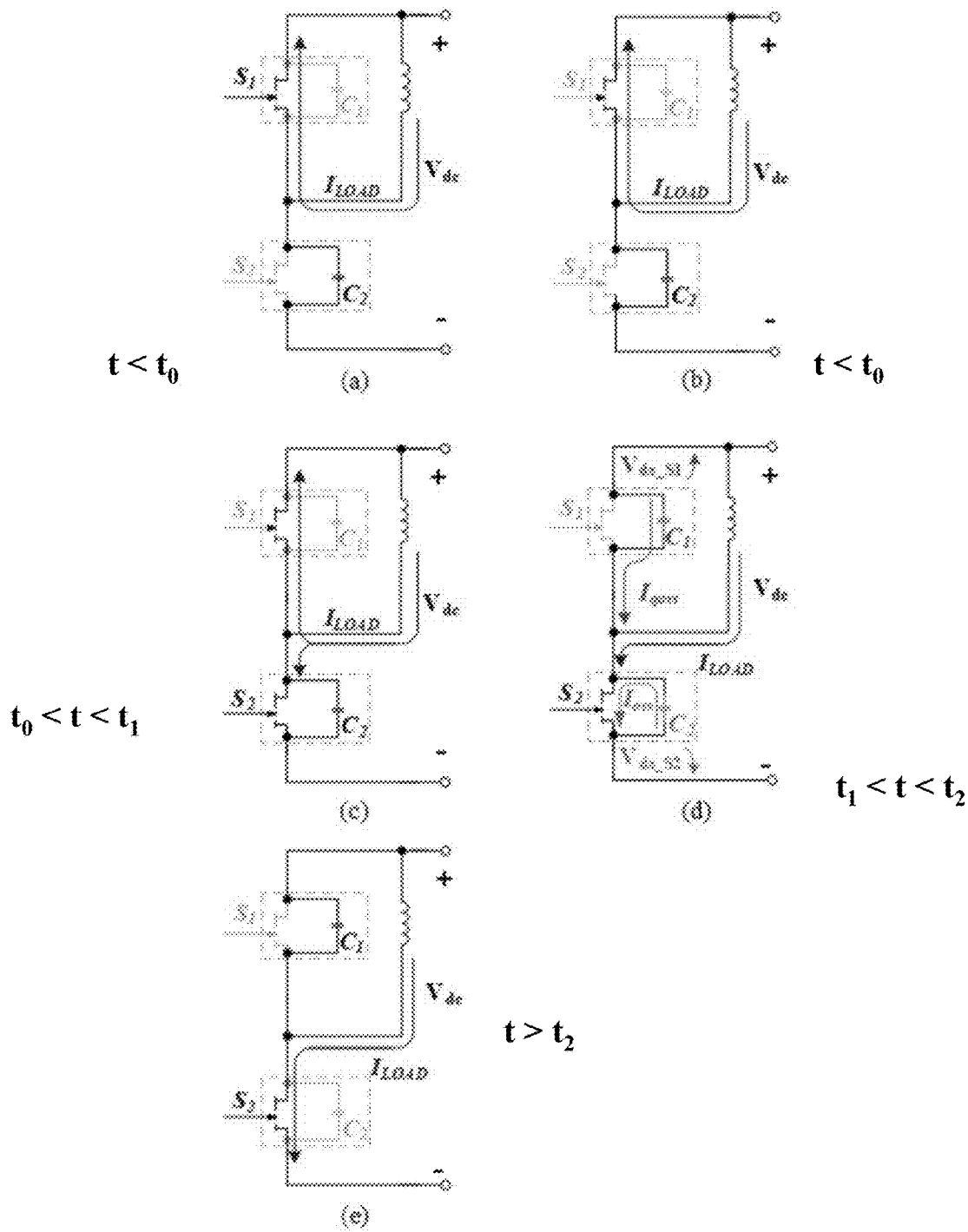
FIG. 3 shows schematic diagrams to illustrate hard-switching transitions for a half-bridge for: (a) $S_1$ conducting; (b) deadtime; (c) current commutation; (d) voltage commutation; (e) $S_2$ conducting.

FIG. 3 shows hard-switching transitions for (a) $S_1$ conducting; (b) deadtime; (c) current commutation; (d) voltage commutation; (e) $S_2$ conducting. The resulting low-side drain current $I_D$ is shown in FIG. 4, which shows hard-switching turn-on waveforms for an example GaN HEMT. During the voltage commutation period, from $t_1$ to $t_2$, as illustrated in FIG. 3(d) the voltage across the high-side switch $S_1$ increases and the voltage across the low-side switch $S_2$ decreases. Accordingly, the parasitic capacitances $C_1$ and $C_2$ will be charged and discharged, respectively. As the two-dimensional electron gas (2DEG) of $S_2$ is conducting and the 2DEG of $S_1$ is turned off, a charging current flows from $C_1$ through $S_2$ to generate a current bump as illustrated in FIG. 4. GaN HEMTs do not have inherent body diodes, therefore exhibit no reverse recovery loss during voltage commutation ($t_1$-$t_2$). The bump area of the low-side drain current $I_D$ results exclusively from the capacitance $C_1$ charging current $I_{qoss}$ from the opposite switch device $S_1$:

$$I_D(t) = I_{qoss}(t) + I_{LOAD}, t_1 < t < t_2$$

This behavior is fundamentally different from Si MOSFETs and SiC MOSFETs. The charging current $I_{quoss}$ for the GaN capacitance ($C_{oss}$) during voltage commutation, i.e. between $t_1$ and $t_2$, can be calculated as:

$$I_{qoss}(t) = C_{oss}(V_{DS}) \frac{dV_{DS}}{dt},$$
$$0 < V_{DS} < V_{dc}; t_1 < t < t_2$$

If there is no cross-conduction, then the equation shown in FIG. 5 should always be satisfied:

$$\int_{t_1}^{t_2}(I_D(t) - I_{LOAD})dt = \int_0^{V_{dc}} C_{oss}(V_{DS})dV_{DS} 0 < V_{DS} < V_{dc}; t_1 < t < t_2$$

In contrast, if there is cross-conduction, the current bump will be greater than $C_{OSS}$ charge:

$$\int_{t_1}^{t_2}(I_D(t) - I_{LOAD})dt > \int_0^{V_{dc}} C_{OSS}(V_{DS})dV_{DS} 0 < V_{DS} < V_{dc}; t_1 < t < t_2$$

which can happen 1) during voltage commutation, 2) after voltage commutation or 3) both during and after voltage commutation.

Examples for three cases are illustrated in FIG. 7, which shows example waveforms for Case 1: cross-conduction occurs during the voltage commutation; Case 2: cross-conduction occurs after the voltage commutation; Case 3: cross-conduction occurs during and after the voltage commutation. As illustrated, there may be multiple pulses after the voltage commutation caused by cross-conduction. The parasitic capacitance $C_{oss}$ of a GaN transistor is independent from the load current, the junction temperature and the switching speed. The parasitic capacitance $C_{oss}$ of a GaN transistor is provided in the datasheet for different $V_{DS}$. For example, FIG. 6 shows a parasitic capacitance $C_{oss}$ curve, i.e. a plot of parasitic capacitance $C_{oss}$ (pF) vs. drain-source voltage $V_{DS}$ for an example 650 V, 25 mΩ, GaN E-HEMT (GaN Systems GS66516T).

Figure 8:
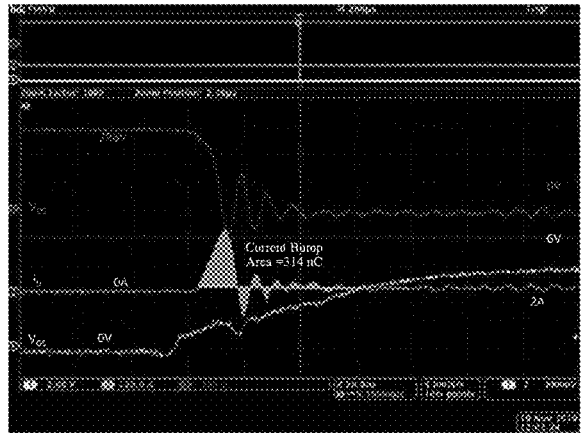
FIGS. 8 and 9 show double pulse test waveforms for examples with cross-conduction conditions.
Figure 9:
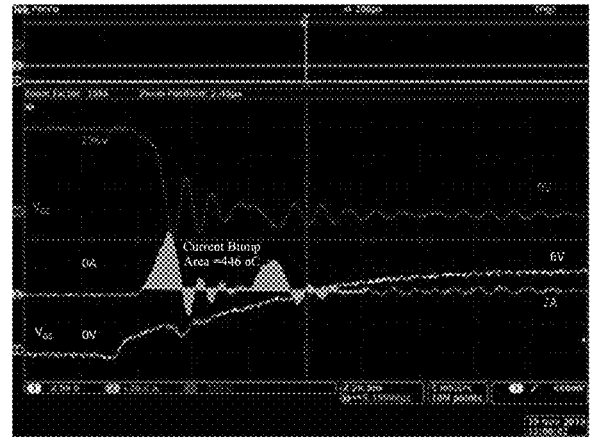
Figure 10:
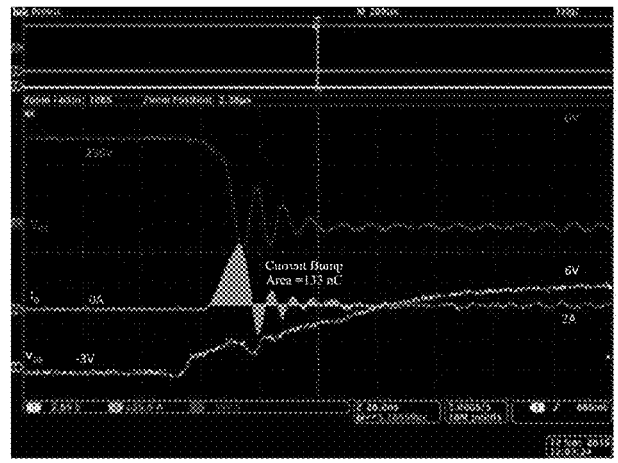
FIG. 10 shows double pulse test waveforms for an example with a normal (no cross-conduction) condition.

FIGS. 8 and 9 show example double pulse test waveforms for two examples with cross-conduction conditions, and FIG. 10 shows double pulse test waveforms for an example of a normal condition, with no cross-conduction. As shown in the example waveforms in FIG. 8, cross-conduction occurs during voltage commutation with $R_{g\_on}$=16Ω, $V_{GS\_off}$=0 V when $V_{DS}$=286 V and $I_{LOAD}$=2A. For the same $R_{g\_on}$=16Ω, and $V\_0$ V, by increasing $V_{DS}$ to 296 V, cross-conduction occurs during and after the voltage commutations, as shown in the example waveforms in FIG. 9. For comparison, an example with no cross-conduction is shown in FIG. 10, using the same $R_{g\_on}$=16Ω, and $I_{LOAD}$=2A, but $V_{GS\_off}$=−3 V.

For this example, the theoretical values of charge from $C_1$ during the voltage commutation period are calculated in the equations shown in FIG. 11 for $V_{DS}$=286 V and $V_{DS}$=296 V. FIG. 11 shows a table listing parameters comprising the current bump area (charge in nC) for the examples shown in FIGS. 8 and 9 for cross-conduction conditions and the example shown in FIG. 10 for a normal condition. The bump charges are higher than the theoretical values (reference values) for the two examples with cross-conduction. For the normal condition, with no-cross conduction, there is a 11 nC different between the measured bump and the theoretical $C_{oss}$ charge (122 nC) which arises from parasitic capacitances $C_{pcb}$ and $C_{pl}$, which are fixed values and independent from cross-conduction.

Since the on-state resistance $R_{ds\_on}$ of a GaN HEMT is low, it is much easier to observe cross-conduction or potential cross-conduction by monitoring the drain current $I_D$ rather than by monitoring the drain-source voltage $V_{DS}$. That is, the drain current bump during voltage commutation can be used to provide a method of monitoring and adjusting or controlling deadtime, e.g. reducing deadtime to reduce deadtime losses while avoiding cross-conduction. Also because the parasitic capacitance $C_{oss}$ of a GaN transistor is independent of load current, junction temperature and switching speed, this method of monitoring and controlling deadtime is independent of these operating parameters. Thus, a circuit comprising drain current bump filter can be used to provide a method of deadtime optimization.

For example, a method of controlling deadtime for a half bridge or full bridge switch topology comprising a driver, wherein high side and low side switches comprise GaN transistors, comprises:
receiving a first input comprising a low-side drain current signal $I_D$;
receiving a second input indicative of a bulk voltage $V_{dc}$;
generating a current difference signal $I_D-1_{LOAD}$, where $I_{LOAD}$ is a load current;

integrating the current difference signal $I_D-1_{LOAD}$ over a time interval of $t_2-t_1$ during voltage commutation to generate a current charge output $$\int_{t_1}^{t_2}(I_D(t)-I_{LOAD})dt;$$

based on the voltage $V_{dc}$ obtaining a reference current charge $C_{oss}$ for the high side switch $$\int_0^{V_{dc}}C_{oss}(V_{DS})dV_{DS} \quad 0<V_{DS}<V_{dc}; t_1<t<t_2;$$

comparing the current charge output and the reference current charge $C_{oss}$, and generating a deadtime adjust output signal;
outputting the deadtime adjust signal to the driver.

For example, the deadtime adjust signal may be used to reduce or optimize deadtime to reduce deadtime losses, while avoiding cross-conduction. If cross-conduction is occurring, the current charge output will be significantly greater than the reference current charge $C_{oss}$, and the deadtime adjust signal can be used to increase deadtime, or other operating parameters, can be changed, to avoid cross-conduction. If cross-conduction is not occurring, the current charge output will be close to, or ideally will match, the reference current charge $C_{oss}$. For example, if cross-conduction is not occurring, the measured drain bump area is closely matches the theoretical $C_{oss}$ charge amount, and the deadtime may be adjusted to reduce the deadtime, and thereby reduce deadtime losses. If cross-conduction is occurring, the deadtime may be increased, or e.g. the $V_{gs\_off}$ is adjusted.

For example, a GaN half-bridge may comprise a current sense output for sensing the drain current ID, and a deadtime optimization circuit comprises a drain current bump filter for generating a current charge output; and circuit elements for comparing the current charge output to a reference current charge $C_{oss}$ and generating a deadtime adjust signal. Current sensing may be based on any appropriate type of current sense circuit, e.g. resistive or inductive, or it may be a current sense output pin of the GaN device.

For example, FIG. 12 shows a functional block diagram of power switching system comprising GaN half-bridge comprising a circuit for implementing a method of deadtime optimization of an example embodiment, based on measuring a current bump during voltage commutation. The high-side and low-side switches comprise GaN transistors. The circuit for controlling deadtime for the half-bridge comprises:
an input for receiving the low-side drain current $I_D$;
an input for sensing the bulk voltage $V_{dc}$;
a unit for generating a current difference signal $I_D-1_{LOAD}$, where $I_{LOAD}$ is a load current;
a timer for recording and counting the deadtime;
an integrator for integrating the current difference signal $I_D-1_{LOAD}$ over a time interval of $t_2-t_1$ during voltage commutation to generate a current charge output $$\int_{t_1}^{t_2}(I_D(t)-I_{LOAD})dt;$$

a reference source for obtaining a reference current charge $C_{oss}$ based on $V_{dc}$;
deadtime adjustment circuitry for receiving the current charge output from the integrator,
comparing the current charge output with the reference current charge $C_{oss}$, and generating a deadtime adjust signal;
an output for outputting the deadtime adjust signal to the driver.

For example, the unit for generating a current difference signal $I_D-1_{LOAD}$ may be a DC blocking unit or a subtractor. The integrator may be an analog integrator or a digital integrator. For example, the reference source may provide real-time calculation of the reference current charge $C_{oss}$, or real-time adjustment of a reference current charge $C_{oss}$, or the reference source may perform an offline look-up from a table of reference current charge values. For example, the reference current charge can be obtained from calculation, and adjusted internally or externally in real-time, or obtained from an off-line look-up table, based on a sensed bulk voltage $V_{dc}$ ($V_{bulk}$). The reference source or reference generation unit provides the reference current charge, which would be a constant value for the selected GaN transistors, based on the selected bulk voltage $V_{dc}$.

If the measured current charge matches the reference current charge $C_{oss}$, there is no cross-conduction. For example, the deadtime adjustment circuitry may comprise a comparator.

To perform deadtime optimization, the timer is used to keep decreasing the dead time between the high-side and low-side GaN switches until the measured current charge exceeds the reference current charge $C_{oss}$. E.g. a minimum deadtime is selected which avoids cross-conduction, while minimizing deadtime and therefore minimizing deadtime losses.

Figure 13:
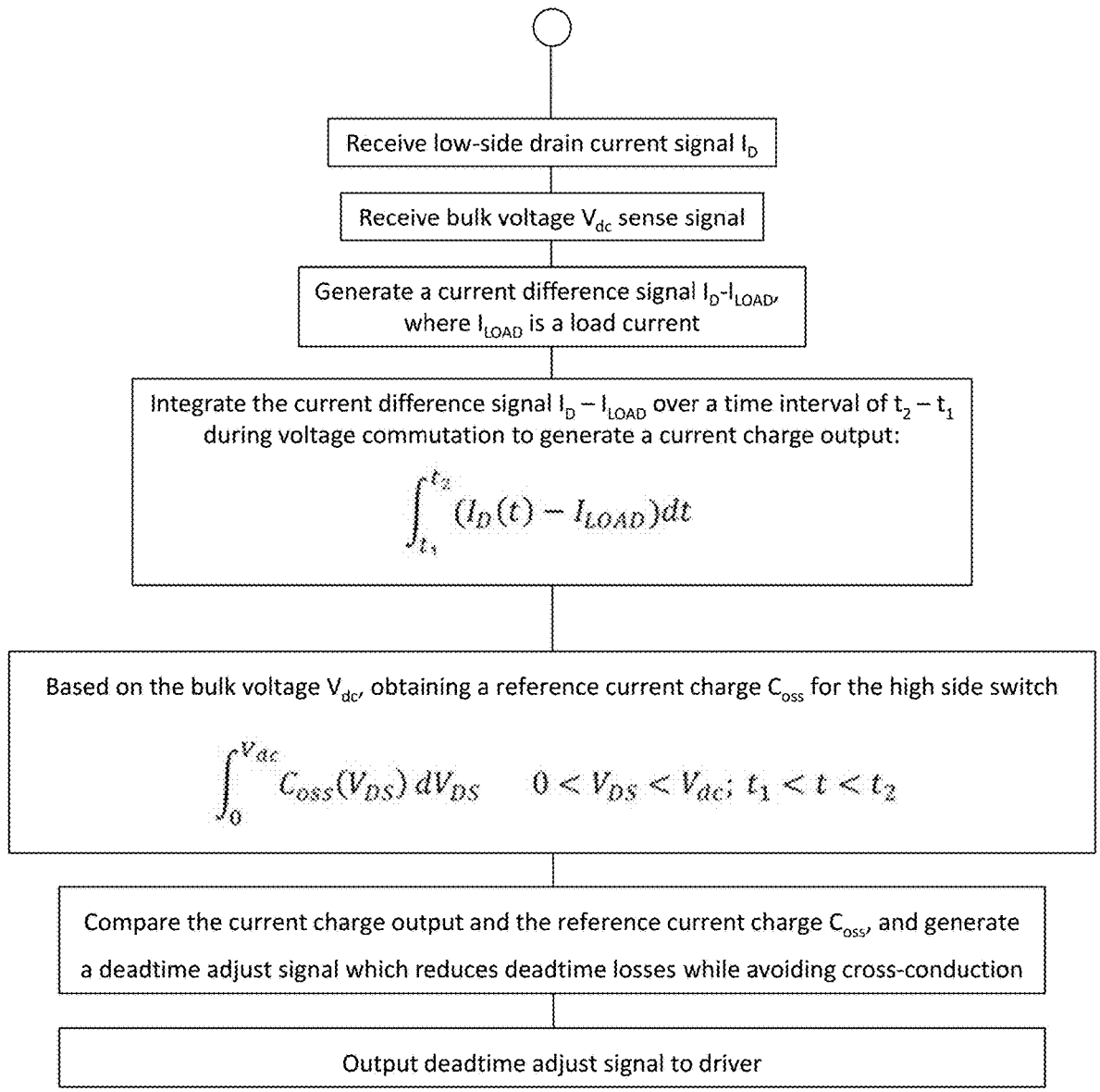
FIG. 13 shows a flow chart to illustrate steps in a method of deadtime optimization of an example embodiment.

FIG. 13 shows a flowchart to illustrate steps of a method of deadtime optimization of an example embodiment.

Methods and circuits of example embodiments for implementing the method use the drain current bump area during voltage commutation to diagnose and avoid cross-conduction, and adjust the deadtime accordingly to minimize deadtime losses, while avoiding cross conduction. Deadtime optimization circuits of example embodiments are applicable to GaN half-bridge and GaN full-bridge switch topologies.

Methods and circuits of example embodiments may provide for e.g. cycle-by-cycle (fast) implementation of deadtime optimization; implementation which provides periodic ongoing measurement and adjustment for deadtime optimization, or one time implementation, e.g. at the factory or on initial power-up. Although the Qoss bump should not change significantly with load, line, temperature or lifetime, for some applications, it may be beneficial to make periodic adjustments of deadtime, e.g. over an operational lifetime or upon a diagnostic command from field service, or based on a periodic DSP command.

Reference is made to an article by Y. Qiu, J. Vanderkloot, R. Hou and J. Lu, "Diagnosing for Cross-conduction in GaN Half-Bridge," 2020 IEEE Applied Power Electronics Conference and Exposition (APEC), New Orleans, La., USA, 2020, pp. 2577-2583, doi: 10.1109/APEC39645.2020.9124086, which is incorporated herein by reference.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A method of controlling deadtime for a half-bridge or full-bridge switch topology comprising a driver, wherein high side and low side switches comprise GaN transistors, comprising:
receiving a first input comprising a low-side drain current signal $I_D$;
receiving a second input indicative of a bulk voltage $V_{dc}$;
generating a current difference signal $I_D-1_{LOAD}$, where $I_{LOAD}$ is a load current;
integrating the current difference signal $I_D-1_{LOAD}$ over a time interval of $t_2-t_1$ during voltage commutation to generate a current charge output;

$$\int_{t_1}^{t_2}(I_D(t)-I_{LOAD})dt;$$

based on the voltage $V_{dc}$ obtaining a reference current charge $C_{oss}$ for the high side switch $$\int_0^{V_{dc}}C_{oss}(V_{DS})dV_{DS} 0<V_{DS}<V_{dc}; t_1<t<t_2;$$

comparing the current charge output and the reference current charge $C_{oss}$, and generating a deadtime adjust output signal;
outputting the deadtime adjust signal to the driver.

2. The method of claim 1, wherein, the deadtime adjust signal is used to reduce or optimize deadtime to reduce deadtime losses, while avoiding cross-conduction.

3. A circuit for controlling deadtime for a half-bridge or full-bridge switch topology comprising a driver, wherein high-side and low-side switches comprise GaN transistors, the circuit comprising a drain current bump filter for generating a current charge output; and circuit elements for comparing the current charge output to a reference current charge $C_{oss}$ and generating a deadtime adjust signal.

4. A circuit for controlling deadtime for a half-bridge or full-bridge switch topology wherein high-side and low-side switches comprise GaN transistors, comprising:
an input for receiving a low-side drain current $I_D$;
an input for sensing a bulk voltage $V_{dc}$;
a unit for generating a current difference signal $I_D-1_{LOAD}$, where $I_{LOAD}$ is a load current;
a timer for recording and counting the deadtime;
an integrator for integrating the current difference signal $I_D-1_{LOAD}$ over a time interval of $t_2-t_1$ during voltage commutation to generate a current charge output;

$$\int_{t_1}^{t_2}(I_D(t)-I_{LOAD})dt;$$

a reference source for obtaining a reference current charge $C_{oss}$ based on $V_{dc}$;
deadtime adjustment circuitry for receiving the current charge output from the integrator,
comparing the current charge output with the reference current charge $C_{oss}$, and generating a deadtime adjust signal;
an output for outputting the deadtime adjust signal to the driver.

5. The circuit of claim 4, wherein the unit for generating a current difference signal $I_D-I_{LOAD}$ is a DC blocking unit or a subtractor.

6. The circuit of claim 4, wherein the integrator is an analog integrator or a digital integrator.

7. The circuit of claim 4, wherein, based on the sensed bulk voltage $V_{dc}$, the reference source provides any one of:
real-time calculation of the reference current charge $C_{oss}$;
real-time adjustment of a stored reference current charge $C_{oss}$;
an offline look-up from a table of reference current charge values.

8. The circuit of claim 4, wherein:
the unit for generating a current difference signal $I_D-I_{LOAD}$ is a DC blocking unit or a subtractor;
the integrator is an analog integrator or a digital integrator; and
based on the sensed bulk voltage $V_{dc}$ the reference source provides any one of:

real-time calculation of the reference current charge $C_{oss}$;

real-time adjustment of a stored reference current charge $C_{oss}$; and an offline look-up from a table of reference current charge values.

9. A power switching system comprising a GaN half-bridge or a GaN full-bridge and a deadtime optimization system comprising a drain current bump filter for generating a current charge output during voltage commutation; and circuit elements for comparing the current charge output to a reference current charge $C_{oss}$, and generating a deadtime adjust signal.

* * * * *